United States Patent Office 3,330,799
Patented July 11, 1967

3,330,799
ELECTRICALLY INSULATING VULCANIZATES
CONTAINING OXIDIZED CARBON BLACK
Andries Voet, Borger, Tex., assignor to J. M. Huber
Corporation, Locust, N.J., a corporation of New Jersey
No Drawing. Filed Jan. 24, 1966, Ser. No. 522,347
10 Claims. (Cl. 260—41.5)

This application is a continuation-in-part of my copending application, Ser. No. 301,947, filed Aug. 14, 1963, entitled "Carbon Black" and now abandoned.

This invention relates to electrically insulating vulcanizates. More particularly, this invention relates to carbon black reinforced electrically insulating vulcanizates.

Carbon blacks are extensively used for many purposes, varying widely as to their characteristics and combination of characteristics by which they are adapted to different specific uses. The rubber and plastic industries, in particular, consume a large volume of carbon black for use as reinforcing fillers in rubber formulations. There are available to the manufacturer, many carbon blacks of the channel and furnace types with varying characteristics which will impart various properties to the rubber. Among these various properties found in the rubber is electrical resistance which is measured in ohm centimeters. This property is important in rubber and plastic compounds used as jackets for insulated wires and cables, and the carbon black used as a reinforcing filler in such rubber must have characteristics which impart high electrical resistance to the rubber.

Manufacturers of electric cables and wires consider it desirable to use compositions of high electric resistivity as cable and wire jackets. The reason, of course, is obviously that a poorly insulating jacket is both hazardous to use and uneconomical due to power losses. The conventional channel carbon blacks heretofore have performed satisfactorily as a reinforcing filler in such uses; however, since the channel blacks are no longer economically attractive, the cable and wire manufacturers have attempted to utilize less expensive reinforcing fillers in their electrically insulating rubber and plastic compounds.

It is therefore an object of my invention to provide electrically resistant vulcanizates reinforced with modified furnace carbon blacks.

It is another object of this invention to provide insulating rubber and plastic compounds suitable for use as cable and wire jackets.

Other objects and advantages of the invention will become apparent from the following specification when considered in light of the annexed claims.

I have discovered that furnace carbon blacks oxidized with specific oxidizing agents, have particular oxygen-containing groups attached to the black. A significant increase in electrical resistance of the vulcanizates compounded with these carbon blacks occurs.

The furnace carbon blacks used in practicing this invention have a mean particle diameter of between 15 and 45 millimicrons, as measured by electron microscopy. Included among these carbon blacks are super abrasion furnace (SAF), high abrasion furnace (HAF), intermediate super abrasion furnace (ISAF) and fast extrusion furnace (FEF). These furnace blacks normally have oxygen contents of from about 0.5 to about 1.4%.

Oxidation of furnace carbon black can be carried out with oxidizing agents such as oxygen, air, ozone, ozone mixtures with air and/or oxygen, hydrogen peroxide, aqueous solutions of alkali perborates, alkali persulfates, oxygen-containing compounds of chlorine, oxygen-containing compounds of nitrogen, alkali permanganates, chromates, bichromates, and many other oxidants; however, not all these oxidants are useful in practicing the invention.

These various oxidizing agents each may affect the carbon black to a different degree. This can be observed, for example, by the varying electrical resistance imparted to vulcanizates reinforced with blacks oxidized with different oxidants but at the same oxidation level. Apparently, separate oxidants put different oxygen-containing groups upon the surface of the carbon black, and each group or combination of groups has its own unique effect on the resistance of the final rubber or plastic compound. Of the groups present, quinone, hydroquinone, semiquinone, lactone, chromene, carbonium, carboxyl and aroxyl have been identified. This list is not necessarily complete, however, and a perfect balance has not as yet been achieved, in view of the inadequacy of present day analytical procedures.

I have discovered, and it is upon this discovery that my invention is predicated, that furnace carbon blacks which impart particularly advantageous electrical resistance to rubber vulcanizates are produced by oxidizing the blacks with oxidizing agents selected from the group consisting of ozone and of inorganic oxygen-containing derivatives of nitrogen and inorganic oxygen-containing derivatives of chlorine. While the reaction mechanism which occurs is not known specifically when these compounds are used, the agents apparently provide the proper type and density of oxygen groups on the carbon black surface to form electrically resistant, reinforced elastomer compositions. Typical examples of such oxidizing derivatives of nitrogen and chlorine are: $HNO_3$, $HNO_2$, $NO$, $NO_2$, $N_2O_5$, $HClO$, $HClO_2$, $HClO_3$, $HClO_4$, $Cl_2O$, $ClO_2$.

The conditions under which the furnace carbon black is oxidized vary with the oxidizing agent. For example, when air, oxygen enriched air or pure oxygen, which are not oxidizing agents of this invention, are used as the oxidizing agents, rapid direct oxidation only takes place at higher temperatures, above 350° C. Rapid oxidation with ozonized air takes place at room temperatures. Rapid oxidation of the furnace carbon black with various compounds of nitrogen takes place at 150 to 230° C. This process is described in French Patent No. 1,195,792.

When carbon blacks treated with the oxidizing agents of this invention are incorporated into natural or synthetic rubber compounds, an insulating vulcanizate is formed. Various types of rubber or elastomers are suitable in the practice of this invention; for example, natural rubber, styrene-butadiene copolymers, neoprene rubber, cis-polybutadiene rubber, ethylene-propylene terpolymers, ethylene-propylene copolymers, polyisoprene and the like, are suitable.

While the process of electrical conduction in elastomers reinforced with carbon blacks is not fully understood, without limiting the present invention nor intending to be bound by any particular theory, the following appears to be an explanation.

The dispersion of conventional furnace black in the polymer matrix leads to a significant increase in the electrical conductivity of the matrix at carbon black loadings required for satisfactory reinforcement. These loadings, generally about 50 parts of carbon black per 100 parts of the rubber, cause the nonconductive gaps in the matrix between conductive particles or particle agglomerates to become small enough to allow passage of elecrtons and thus impart a higher conductance to the matrix. If the particles of carbon black filler have a continuous film of oxygen groups at their surfaces, they will prevent electrical conductance in the matrix. An indication of the correctness of this assumption was obtained by treating the high resistivity-imparting oxidized blacks in vacuum at 950° C. for 1 hour, thereby removing the oxygen completely from the surface. As a result, these blacks had lost their characteristic ability to form insulating vulcanizates.

While it has been determined that various oxygen-containing groups at the carbon black surface form insulation-imparting films, these groups are not equally effective. Furthermore, different oxidizing agents promote the formation of different combinations of oxygen-containing groups on the surface of the carbon black.

If the carbon black were to be completely oxidized, carbon dioxide gas would result. This, of course, is an undesirable result. Incomplete oxidation of the carbon black results in carbon monoxide, other oxides of carbon and, under controlled conditions, surface oxides. These surface oxides are the oxygen-containing groups indicated previously, which remain attached to the hexagonal carbon skeleton of the carbon black particles.

Not every oxygen-containing group has the same electrical insulating effect. Since different oxygen-containing groups are formed by the various oxidizing agents, the true test, therefore, of the value of the oxidation of the carbon black insofar as insulating power is concerned, is not only the amount of oxygen present, but also the types of oxygen-containing groups attached to their surfaces. As mentioned previously, analytical methods of today are inadequate to identify all the insulation-imparting groups. As a general rule, however, when the oxidized carbon blacks of this invention have their normal oxygen content increased by at least 1% they are capable of imparting electrical resistivity to the vulcanizate for purposes of this invention. The amount of resistivity impared are a given oxygen level varies with the groups. Volume resistivities in the rubber of the order of $10^6$ ohm centimeters and higher are adequate to impart sufficient insulation to matrices used for cable and wire sheaths.

The furnace carbon blacks can be oxidized in either the fluffy or pelletized form. However, the pelletized form is preferred since it is easier to handle.

The oxygen contents of the blacks are measured by the direct method as described in American Ink Maker, vol. 38, No. 9, page 44 (1960). By this method, carbon black is pyrolyzed in a nitrogen stream at 1200° C. The pyrolysis products are then passed over pure carbon at 1120° C. converting all oxygen into carbon monoxide. The CO gas is converted into carbon dioxide which is then isolated by freezing out in vacuum at liquid nitrogen temperatures. A quantitative estimation of the carbon dioxide, and thus of the original oxygen, is made by determining the pressure of the $CO_2$ after removal of the liquid bath and attainment of room temperature.

The electrical resistance of the vulcanizates of high resistance according to the invention was measured according to ASTM method D257. The vulcanizate selected was a representative neoprene vulcanizate prepared according to the following recipe:

VULCANIZATE A

| | Parts by weight |
|---|---|
| Polymer: Neoprene GNA | 100.0 |
| Filler: Carbon black | 40.0 |
| Processing aid: Stearic acid | 1.0 |
| Antioxidant: Phenyl alphanaphthylamine | 2.0 |
| Vulcanizing agent: Magnesium oxide | 4.0 |
| Vulcanizing agent: Zinc oxide | 5.0 |

The following examples are illustrative of my invention and in no way intended to be restrictive.

*Example 1*

100 parts of a dried conventional HAF carbon black was heated to 200° C. in a glass container, while being agitated. A slow stream of $NO_2$ was admitted, while agitation of the black was maintained. A total quantity of 5 grams was introduced over a period of 2 hours. Thereafter, excess of $NO_2$ was removed by vacuum, while maintaining the temperature. The original HAF black had an oxygen content of 0.85% as measured by the direct method previously indicated. The oxidized black had an oxygen content of 3.69%. Volume resistivity in Vulcanizate A was $7.9 \times 10^3$ ohm centimeters for the original HAF, while the oxidized HAF in Vulcanizate A had a volume resistivity of $2.7 \times 10^9$ ohm centimeters, an increase by a factor of 350,000.

*Example 2*

Example 1 was repeated using NO instead of the $NO_2$ under identical conditions. The oxidized black had an oxygen content of 2.25% and a volume resistivity of $1.4 \times 10^7$ in Vulcanizate A.

*Example 3*

Example 1 was repeated, except that ISAF black was used instead of HAF. The oxidized carbon black had an oxygen content of 3.79% and its volume resistivity in Vulcanizate A was $2.1 \times 10^7$ ohm centimeters. The original ISAF black had an oxygen content of 1.10% and a volume resistivity of 126 ohm centimeters in Vulcanizate A, an increase by a factor of 170,000.

*Example 4*

100 grams of an HAF black of Example 1 was refluxed at the boiling temperature under agitation for 24 hours with 40% nitric acid. The resulting black was found to be 11.0% and its volume resistivity in Vulcanizate A was $6.5 \times 10^{11}$ ohm centimeters.

*Example 5*

100 grams of an HAF black of Example 1 was refluxed at the boiling temperature under agitation with a 10% solution of sodium nitrate. 40 grams of a 20% solution of sulfuric acid was added dropwise over a period of 12 hours. The black was then filtered, washed and dried. Its oxygen content was 9.2% and its volume resistivity in Vulcanizate A was $2.3 \times 10^{10}$ ohm centimeters.

*Example 6*

100 grams of an HAF black of Example 1 was agitated at room temperature for 24 hours with a solution of 500 grams of sodium hypochlorite in water containing 12% active chlorine. The black was then filtered, washed and dried. Its oxygen content was 3.92% and its volume resistivity in Vulcanizate A was $2.7 \times 10^8$ ohm centimeters.

*Example 7*

100 grams of an HAF black of Example 1 was agitated at 70° C. in 1000 grams of a 1% solution of sodium chlorate, while 30 grams of a 20% solution of sulfuric acid in water was added dropwise over a period of 6 hours. The black was then filtered, washed, and dried. Its oxygen content was 3.70% and its volume resistivity in Vulcanizate A was $4.9 \times 10^9$ ohm centimeters.

*Example 8*

Example 7 was repeated except that an SAF carbon black was used with sodium perchlorate as oxidizing agent. The black was filtered, washed, and dried. Its oxygen content was increased from 1.38% to 3.86% and its volume resistivity increased from $1.4 \times 10^3$ to $4.3 \times 10^8$ in Vulcanizate A.

*Example 9*

100 grams of an HAF black of Example 1 was placed in a cylindrical glass vessel with a porous fritted glass bottom. An ozone and oxygen mixture containing 30 milligrams of ozone per liter was passed at room temperature through the porous bottom at a flow rate of 1000 cubic centimeters per minute, thereby oxidizing the black under conditions of a fluidized bed. After 15 minutes, the black was removed. Its oxygen content was 2.1% and its volume resistivity in Vulcanizate A was $3.9 \times 10^9$ ohm centimeters.

*Example 10*

The process of Example 9 was repeated, but the black was now subjected to oxidation by the ozone-oxygen mixture at room temperature for 180 minutes. The oxygen content was 3.7%. Its volume resistivity was then determined in the following butyl rubber recipe.

VULCANIZATE B

| | Parts by weight |
|---|---|
| Polymer: Butyl rubber | 100.0 |
| Filler: Carbon black | 50.0 |
| Vulcanizing agent: Zinc oxide | 5.0 |
| Vulcanizing agent: Sulfur | 1.25 |
| Processing aid: Stearic acid | 2.0 |
| Accelerator: 2-mercapto benzothiazole | 1.0 |
| Accelerator: Tetramethylthiuram disulfide | 1.5 |

The value for the volume resistivity was $1.6 \times 10^8$ ohm centimeters.

Table A compares the results of Examples 1 through 10.

TABLE A

| Example | Vulcanizate | Oxidant | Black | Resistivity Untreated | Resistivity Treated | Factor | $O_2$ Content Untreated | $O_2$ Content Treated | Increase In $O_2$ Content |
|---|---|---|---|---|---|---|---|---|---|
| 1 | A | $NO_2$ | HAF | $7.9 \times 10^3$ | $2.7 \times 10^9$ | $3.5 \times 10^5$ | 0.85 | 3.69 | 2.84 |
| 2 | A | NO | HAF | $7.9 \times 10^3$ | $1.4 \times 10^7$ | $1.8 \times 10^3$ | 0.85 | 2.25 | 1.40 |
| 3 | A | $NO_2$ | ISAF | $1.26 \times 10^2$ | $2.1 \times 10^7$ | $1.7 \times 10^5$ | 1.10 | 3.79 | 2.69 |
| 4 | A | $HNO_3$ | HAF | $7.9 \times 10^3$ | $6.5 \times 10^{11}$ | $8.3 \times 10^7$ | 0.85 | 11.0 | 10.2 |
| 5 | A | $NaNO_2$ | HAF | $7.9 \times 10^3$ | $2.3 \times 10^{10}$ | $2.9 \times 10^6$ | 0.85 | 9.2 | 8.3 |
| 6 | A | NaOCl | HAF | $7.9 \times 10^3$ | $2.7 \times 10^8$ | $3.3 \times 10^4$ | 0.85 | 3.92 | 3.07 |
| 7 | A | $NaClO_3$ | HAF | $7.9 \times 10^3$ | $4.9 \times 10^9$ | $6.1 \times 10^5$ | 0.85 | 3.70 | 2.85 |
| 8 | A | $NaClO_3$ | SAF | $1.4 \times 10^3$ | $4.3 \times 10^8$ | $3.1 \times 10^5$ | 1.38 | 3.86 | 2.48 |
| 9 | A | $O_3$ | HAF | $7.9 \times 10^3$ | $3.9 \times 10^9$ | $4.9 \times 10^5$ | 0.85 | 2.10 | 1.25 |
| 10 | B | $O_3$ | HAF | $1.2 \times 10^4$ | $1.6 \times 10^8$ | $1.3 \times 10^4$ | 0.85 | 3.70 | 2.85 |

From Table A it may be clearly seen that in each example of the invention there is at least a 1.0% increase in the oxygen content of the carbon black. In addition each example also demonstrated at least a 1000 fold increase in volume resistivity which far exceeds the resistivity obtained using untreated black or oxidants other than those of the invention.

Oxidation with agents other than the above mentioned generally leads to very limited increase in resistivity, not sufficient to impart satisfactory resistance to a cable and wire jacket vulcanizate. For instance, the HAF blacks of the examples were oxidized with various agents, and the oxygen content as well as the volume resistivity in Vulcanizate A was determined. The results are indicated in the following table.

TABLE B

| Vulcanizate | Oxidant | Black | Resistivity Untreated | Resistivity Treated | Factor | $O_2$ Content Untreated | $O_2$ Content Treated | Increase $O_2$ Content |
|---|---|---|---|---|---|---|---|---|
| A | Air (6 hrs. 375° C.) | HAF | $7.9 \times 10^3$ | $1.7 \times 10^4$ | 2.2 | 0.85 | 4.24 | 3.39 |
| A | $H_2S_2O_8$ | HAF | $7.9 \times 10^3$ | $2.7 \times 10^4$ | 3.4 | 0.85 | 2.87 | 2.02 |
| A | $H_2O_2$ | HAF | $7.9 \times 10^3$ | $0.9 \times 10^4$ | 0.9 | 0.85 | 2.27 | 1.42 |
| A | $H_3BO_3$ | HAF | $7.9 \times 10^3$ | $1.6 \times 10^5$ | 20.2 | 0.85 | 2.25 | 1.40 |
| A | $O_2$ (1 hr. 350° C.) | HAF | $7.9 \times 10^3$ | $3.2 \times 10^4$ | 4.0 | 0.85 | 3.89 | 3.04 |

It may be seen, for instance, that oxidation with ozone leading to a 2.1% oxygen content results in a satisfactory resistivity of Vulcanizate A, while air oxidation to an oxygen content of 4.2% does not produce acceptable resistivity in the reinforced vulcanizate.

The examples were repeated using each of the polymers set forth above in suitable recipes. In each case, similar resistivity of the vulcanizates was noted.

Having thus described the preferred embodiments of the invention, it should be understood that numerous modifications may be resorted to without departing from the scope of the appended claims.

I claim:
1. An electrically resistant vulcanizate which includes an elastomer, a processing aid, a vulcanizing agent and a furnace carbon black reinforcing filler having a mean particle diameter of between 15 and 45 millimicrons oxidized to at least 1 precent increase in oxygen content with an oxidant selected from the group consisting of ozone, inorganic oxygen-containing derivatives of nitrogen and inorganic oxygen-containing derivatives of chlorine, said vulcanizate having an electrical volume resistivity of at least a thousand fold over the vulcanizate made with the same black before oxidation.

2. A vulcanizate as claimed in claim 1 wherein the vulcanizate has an electrical volume resistivity of at least one million ohm centimeters.

3. A vulcanizate as claimed in claim 1 wherein the oxidized black has an oxygen content of not less than 2%.

4. A vulcanizate as claimed in claim 3 in which the oxidant is ozone.

5. A vulcanizate as claimed in claim 3 in which the oxidant is nitric acid.

6. A vulcanizate as claimed in claim 3 in which the oxidant is nitrogen dioxide.

7. A vulcanizate as claimed in claim 3 in which the oxidant is an inorganic oxygen derivative of chlorine.

8. A vulcanizate as claimed in claim 2 in which the elastomer is neoprene rubber.

9. A vulcanizate as claimed in claim 2 in which the elastomer is butyl rubber.

10. A vulcanizate as claimed in claim 3 in which the oxidant is nitric acid and the elastomer is neoprene rubber.

References Cited

UNITED STATES PATENTS

| 2,420,810 | 5/1947 | Bray et al. | 260—41.5 |
| 2,439,442 | 4/1948 | Amon et al. | 260—41.5 |
| 2,682,448 | 6/1954 | Cines | 23—209.1 |
| 2,686,107 | 8/1954 | Jordan | 23—209.1 |
| 2,852,486 | 9/1958 | Gessler | 260—41.5 |
| 3,178,387 | 4/1965 | Gessler | 260—31.8 |

MORRIS LIEBMAN, *Primary Examiner.*

ALLAN LIEBERMAN, *Examiner.*

J. S. WALDRON, *Assistant Examiner.*